United States Patent [19]

Todd, Jr.

[11] Patent Number: 4,999,205

[45] Date of Patent: Mar. 12, 1991

[54] CURCUMIN COMPLEXED ON WATER-DISPERSIBLE SUBSTRATES

[75] Inventor: Paul H. Todd, Jr., Kalamazoo, Mich.

[73] Assignee: Kalamazoo Holdings, Inc., Kalamazoo, Mich.

[21] Appl. No.: 395,447

[22] Filed: Aug. 17, 1989

[51] Int. Cl.$^5$ ............................................. A23L 1/27
[52] U.S. Cl. .................... 426/250; 426/540; 426/588; 8/518
[58] Field of Search .............. 426/250, 540, 588; 8/518

[56] References Cited

U.S. PATENT DOCUMENTS

| | | | |
|---|---|---|---|
| 2,982,656 | 5/1961 | Langenau | 426/250 |
| 3,162,538 | 12/1964 | Todd | 426/540 |
| 3,316,101 | 4/1967 | Borenstein | 426/250 |
| 3,455,838 | 7/1969 | Marotta | 426/96 |
| 3,790,688 | 2/1974 | Walter | 426/250 |
| 4,138,212 | 2/1979 | Stransky | 426/250 X |
| 4,187,323 | 2/1980 | Gidlow | 426/250 |
| 4,263,333 | 4/1981 | Maing | 426/540 |
| 4,304,792 | 12/1981 | Sreenivasan | 426/250 |
| 4,307,117 | 12/1981 | Leshik | 426/96 |
| 4,315,947 | 2/1982 | Todd | 426/250 |
| 4,368,208 | 1/1983 | Schranz | 426/250 |
| 4,409,254 | 10/1983 | Gavin | 426/250 |
| 4,414,234 | 11/1983 | Sreenivasan | 426/250 X |
| 4,475,919 | 10/1984 | Woznicki | 8/518 |

FOREIGN PATENT DOCUMENTS 0200043 11/1986 European Pat. Off. .
54-163866 7/1979 Japan .
56-019220 2/1981 Japan .

OTHER PUBLICATIONS

Whistler, R. L., Editor, *Industrial Gums,* Second Edition–1973.

*Primary Examiner*—Jeanette Hunter
*Attorney, Agent, or Firm*—Gordon W. Hueschen

[57] ABSTRACT

A curcumin complex with a water-soluble branched chain or cyclic polysaccharide or a water-soluble or water-dispersible protein, which will not precipitate upon standing in water, which gives an essentially stable yellow solution in water, and from which complex curcumin cannot be removed by centrifugation, as well as a process for preparing such a complex of curcumin and a substrate, selected from a water-soluble branched chain or cyclic polysaccharide and a water-soluble or water-dispersible protein, by contacting the substrate and curcumin in an aqueous solution at a pH above about 9, at which pH the curcumin is present in its water-soluble red alkaline form, and then acidifying to drop the pH to below about 8, thereby complexing the curcumin in its neutral yellow form with the substrate, are disclosed.

30 Claims, No Drawings

CURCUMIN COMPLEXED ON WATER-DISPERSIBLE SUBSTRATES

BACKGROUND OF THE INVENTION AND PRIOR ART

1. Field of Invention

Clear water-soluble curcumin complexes with improved light stability and tinctorial power.

2. Background of the Invention

Curcumin, which is the principle yellow pigment in turmeric, is widely used in coloring foods, such as pickles, mustard, and snacks. In some foods such as mustard, ground turmeric is the source of the pigment, and the fibrous cellulosic turmeric root, to which curcumin is not complexed, acts as a bodying agent for the mustard. In pickles, the oleoresin of turmeric is used in a diluted form, in which the curcumin is dissolved and made into an emulsifiable form by the addition of polysorbate 80. In snacks, if the aroma and bitterness of the oleoresin are objectionable, a deflavorized oleoresin may be prepared, and this is used as a polysorbate solution or a microcrystalline suspension in vegetable oil. If only the slight flavor imparted by relatively pure curcumin is tolerable, the curcumin is isolated in crystalline form and either solubilized in polysorbate 80 or used in a microcrystalline form.

At room temperature, curcumin is so insoluble in water or vinegar that virtually no yellow shade is imparted to the liquid. This is why, in aqueous systems, oleoresin turmeric or curcumin dissolved in polysorbate 80, and then emulsified into the aqueous medium, is used. Polysorbate 80 has its drawbacks, however, which include off flavors which are accentuated on aging, and a pro-oxidant effect. It is used because there is no alternative when turmeric colors are desired in aqueous systems. This invention provides an alternative, which overcomes these drawbacks and which, in addition, significantly increases the stability of the colored solution in light.

When used to color fatty foods, microcrystalline forms of the pigment are used. Curcumin has limited solubility in vegetable oil, and will impart a light yellowish cast to it at the saturation point. However, if curcumin crystals are present, these will give a yellower cast but, because of the crystalline structure, they are not efficient as tinctorial agents. In addition, when water is present as in oleomargarine, the curcumin will slowly migrate to sulfite wrapper, which will become stained. This is why margarine sticks, wrapped in paper, are not colored with annattoturmeric mixtures at the present time. This invention provides a turmeric color which will not bleed and stain the sulfite wrapper. Furthermore, since the curcumin is not present in crystalline form, it is efficiently used for its tinctorial power.

If oleoresin turmeric or curcumin is to be used on a snack, it is sometimes dissolved in hot vegetable oil to increase its solubility, and this in turn is sprayed onto the snack. Much of the curcumin will precipitate on cooling of the snack, due to its lower solubility in the oil, and the yellow color is then a combination of dissolved and crystalline curcumin, the latter being an inefficient coloring agent. The present invention surmounts this limitation.

Solutions of curcumin or oleoresin turmeric fade rather rapidly in light. This is why FD&C yellow #5 is widely use to color pickles, in spite of its causing allergic reactions. Likewise, the surface of a margarine or butter containing curcumin and a redder pigment, such as annatto, will change hue in the light as the curcumin fades. Complexing increases light stability, making termination of the use of the objectionable yellow 5 more readily accomplished.

DEVELOPMENT OF THE PRIOR ART

The most widely used form of oleoresin turmeric and curcumin is the unpatented mixture of polysorbate 80 and the oleoresin. Because of the limitations described in the foregoing, various attempts have been made to avoid its use.

In 1961, Langenau (U.S. Pat. No. 2,982,656) described making an alkaline solution of curcumin, and optionally separating it from the insoluble portions of the oleoresin. He finds that, upon acidification of the alkaline solution, curcumin is precipitated in a finely divided state and the crystalline curcumin then is sorbed onto the foodstuff and colors it, when the acidified solution is poured over the foodstuff. In another embodiment, he describes dipping dressed chicken into an alkaline solution of curcumin (25%) and then dipping the chicken into a 15% citric acid solution to neutralize the alkali, thus releasing the curcumin, which is sorbed on the surface of the chicken. In a third embodiment, he admixes disodium curcumin (a powder) with cerelose (dextrose) and dusts that on a chicken, and then, by dipping in 10% lactic acid liberates free curcumin, which is sorbed on the foodstuff. His invention does not appear to have been used commercially, perhaps because the alkaline solutions or salts of curcumin degrade rapidly to a brown color (within hours), because the concentration (and therefore cost) of curcumin is so high, or because the acid used to liberate the curcumin in microcrystalline form leaves an objectionable flavor on the foodstuff, as well as because the strong alkali curcumin solution in which the chicken is immersed colors the meat irregularly, and leaves the flesh spotted rather than uniformly coated with curcumin. The dust itself, containing dextrose and disodium curcumate, is not stable, due to the alkaline form of curcumin. His invention, depending upon the liberation of curcumin and subsequent sorbtion on the foodstuff, differs from this invention because no complexing from an alkaline solution, by use of acid, on a substrate is involved, and because free, rather than complexed, curcumin is used as his coloring agent.

In 1964, Todd (U.S. Pat. No. 3,162,538) described a microcrystalline suspension of curcumin and bixin (a red pigment from annatto) which colored margarine and in which the curcumin prevented the bixin from turning pink on storage, when dissolved in the oil phase of the margarine. While providing a stable coloring preparation, it was found to have the objectionable property of coloring the sulfite margarine wrapper a yellow-green. A number of patents have been issued which cover the techniques of spray drying or encapsulating water-insoluble substances, which could be utilized to form dry powders of microcrystalline curcumin. For example, Marotta et al. (U.S. Pat. No. 3,455,838) in 1969 uses a modified starch for such a purpose. Walter et al. (U.S. Pat. No. 3,790,688), in 1974, describe a water-dispersible beta-carotene suspension on starch. Borenstein et al. (U.S. Pat. No. 3,316,101) describe a means of preparing water dispersions of carotenoids. All of these inventions would apply equally well to microcrystalline curcumin, whether pulverized or precipitated from an alkaline solution by the method of Langenau. In relation to curcumin content, these preparations will have low tinctorial power because the curcumin is crystalline, and the dispersions are hazy and precipitate. A variation, using the product of Todd, is described by Gidlow (U.S. Pat. No. 4,187,323) in 1980. Stransky (U.S. Pat. No. 4,138,212), in 1979, described a process for making a curcumin coloring agent from turmeric root by extracting the root with a hot soap solution at a pH of about 7 and filtering. This soap solution is dispersible in water, or it may be acidified to recover the curcumin mixed with fatty acids, and this used to color vegetable oils.

Maing et al. (U.S. Pat. No. 4,263,333) described, in 1981, the formation of water "soluble" metal adducts of curcumin dissolved in polysorbate 80, which provided hues different than curcumin itself when emulsified in water. While these different hues may be desired, they do not appear to be permitted for use in foods because they are organometallic compounds.

Leshik (U.S. Pat. No. 4,307,117) in 1981, describes a method of encapsulating a dispersion of curcumin so as to protect it from alkaline baking powders, and thereby provide stability to the color in dry cake, etc., mixes. Sreenivasan et al. (U.S. Pat. No. 4,304,792) in 1981 and U.S. Pat. No. 4,414,234 in 1983, described the use of a redder natural pigment combined with a greenish yellow carotenoid as a margarine color, which would overcome the efect of curcumin in discoloring sulfite wrappers.

Schranz (U.S. Pat. No. 4,368,208), in 1983, describes dissolving curcumin in acetic acid solution, adding gelatin, and removing the acetic acid therefrom, to give a water-dispersible curcumin-gelatin aggregate. Aside from the cost of the acetic acid and its removal, the product is acceptable for cake mixes, overcoming the objectionable use of emulsifying agents. The product is not suggested for use in pickles, or other aqueous sytems, however, perhaps because of its cost, haziness at useful concentrations, and fall-out of curcumin. It is a microcrystalline dispersion of curcumin in gelatin, and not a gelatin-curcumin complex within the meaning of this invention, for the microcrystalline curcumin may be physically separated from the Schranz product by centrifuging in water.

Woznicki et al. (U.S. Pat. No. 4,475,919), in 1984, described a water-insoluble powder, such as cellulose (an unbranched polymer), with curcumin attached, made by adding an alkaline solution of curcumin to the cellulose suspended in aluminum chloride (an acidic solution), wherein the aluminum chloride precipitates the curcumin and assists in making it adhere to the cellulose, which becomes a substitute for an aluminum lake of FD&C #5 (see Example 8(C)). Optionally, organic solvents may be used to dissolve the curcumin prior to addition to the aluminum chloride solution. This procedure differs from the process of the present invention by not contacting the cellulose with the curcumin under alkaline conditions, and the product differs in that the curcumin does not complex with the cellulose, and may be readily removed with a solvent for curcumin.

Shinagawa et al., Japan (79,163,866), in 1979, described making a powder consisting of 1.6% curcumin and cellulose by mixing an aqueous suspension of the cellulose with an alkaline solution of curcumin, agitating, neutralizing, and filtering. The powder dispersed in water or oil, but being based on cellulose, was not soluble. The curcumin was sorbed, or precipitated on the cellulose, it being such a long, straight chain polymer that it is neither soluble in water, nor does curcumin complex with it.

Brief Statement of the Invention

Curcumin is complexed on a water-soluble branched chain or cyclic polysaccharide or on a protein substrate by reacting an aqueous alkaline solution of curcumin with the substrate dispersed in water, and neutralizing the solution to complex the curcumin on the substrate. The curcumin-substrate complex has the same water solubility as the substrate, and is more stable to light than other forms of curcumin which are not complexed on such a substrate. These complexes, devoid of emulsifying agents, and prepared without the use of fixing agents, have a wide range of application in foods.

It has been found that the red alkaline solution of curcumin, with or without the other constitutents of turmeric being present, when mixed with substrate comprising a branched chain or cyclic polysaccharide or with a protein, which is also present under alkaline conditions, agitated briefly to allow a curcumin:substrate complex to form, and then acidified to the yellow form of curcumin, and optionally dried, provides an intensely yellow, clear, relatively light-stable yellow color for water-based and oil-based foods. Details of the invention and its practice will be provided in the following.

It is well known that cellulose is a linear, unbranched polymer, and that it forms strong hydrogen bonds to itself. Branched-chain polysaccharides, such as amylopectins, modified starches, vegetable gums such as arabic, ghatti, karaya, and other branched-chain industrial gums, are less weakly bonded to each other and are therefore considered water soluble. The presence of the branched chain may explain why they complex with the alkaline curcumin. Proteins, perhaps because of their helical nature, are also capable of forming this complex with alkaline curcumin. However, precisely why and how the complex is formed is only a matter of speculation at this time and I do not wish to be bound by any theory of why or how the observed phenomenon occurs.

SUMMARY OF THE DISCLOSURE

The invention, then, inter alia, comprises the following, alone or in combination:

A process for preparing a complex of curcumin and a substrate selected from a water-soluble branched chain or cyclic polysaccharide and a water-soluble or water-dispersible protein which comprises contacting the substrate and curcumin in an aqueous solution at a pH above about 9, at which pH the curcumin is present in its water-soluble red alkaline form, and then acidifying to drop the pH to below about 8, thereby complexing the curcumin in its neutral yellow form with the substrate; such a process wherein the substrate is selected from milk protein, sodium caseinate, whey, gelatin, modified food starch, pectin, a vegetable gum, propylene glycol alginate, cyclodextrin, maltodextrin derived from amylopectin, and carboxymethylcellulose; such a process wherein the pH of the aqueous solution prior to acidification is above about 11; such a process wherein the curcumin is complexed with a combination of substrates; such a process wherein the substrate is a combination of gelatin and a vegetable gum; such a process wherein the substrate is gelatin, gum arabic, gum karaya, gum ghatti, modified food starch, or carboxymethylcellulose; such a process wherein the process is carried out in the presence of a water-miscible, non-acidic solvent which does not interfere with the complexing of the alkaline curcumin with the substrate; such a process wherein the solvent is selected from the group consisting of alcohols, glycerine, and propylene glycol; and such a process wherein the solvent is ethyl alcohol, glycerine, or propylene glycol.

Moreover, a complex of curcumin with a water-soluble branched chain or cyclic polysaccharide or a water-soluble or water-dispersible protein, which will not precipitate upon standing in water, which gives an essentially stable yellow solution in water, and from which complex curcumin cannot be removed by centrifugation; such a complex wherein the substrate is selected from milk protein, sodium caseinate, whey, gelatin, modified food starch, pectin, a vegetable gum, propylene glycol alginate, cyclodextrin, maltodextrin derived from amylopectin, and carboxymethylcellulose; such a complex of curcumin with a substrate selected from a water-soluble branched chain or cyclic polysaccharide and a water-soluble or water-dispersible protein, the curcumin being complexed to the substrate by acidification from an alkaline solution of curcumin and substrate; such a curcumin complexed with a water-soluble branched chain or cyclic polysaccharide or a water-soluble or water-dispersible protein by a process which comprises contacting the substrate and curcumin in an aqueous solution at a pH above about 9, at which pH the curcumin is present in its water-soluble red alkaline form, and then acidifying to drop the pH to below about 8, thereby complexing the curcumin in its neutral yellow form with the substrate; and such a curcumin complex, with a water-soluble branched-chain or cyclic polysaccharide or a water-soluble or water-dispersible protein, produced according to any of the foregoing procedures.

Additionally, the process of mixing curcumin and liquid whey or skim milk, agitating the mixture at an alkaline pH above about 9, dropping the pH to below about 8, and then drying, and a dry milk solid product produced by such method.

OBJECTS OF THE INVENTION

It is an object of the present invention to provide novel and stable complexes of curcumin with substrates selected from polysaccharides and proteins and a method for the production thereof. It is a further object of the invention to provide such a complex which is produced by acidification from an alkaline solution of curcumin and a substrate, which will not precipitate upon standing in water, which gives an essentially stable yellow solution in water and from which complex curcumin cannot be removed by centrifugation. Another object is the provision of such an improved curcumin product and a process for production thereof, with all of the attendant advantages of the stable curcumin complex upon its use in the coloring of foods, drinks, and the like. Additional objects will become apparent hereinafter as the description proceeds, and still others will be obvious to one skilled in the art to which this invention pertains.

DETAILED DESCRIPTION OF THE INVENTION

The following examples will show the preferred forms of this invention, using water-soluble branched-chain and cyclic polysaccharides and proteins; demonstrate how to differentiate uncomplexed, sorbed curcumin from the complexes which are the subject of this invention; describe the unexpected nature of the results of this invention in relation to the prior art; show typical examples of product use; and describe the particularly practical and economic aspects of this invention in relation to the prior art and food technology.

The following preparations and examples are given to illustrate the present invention and are not to be construed as limiting.

EXAMPLE 1

Preparation of Alkaline Curcumin Solution.

The solution of curcumin is preferably made using KOH, and optionally using NaOH, by agitating a wet curcumin powder in water, suitably degassed and under inert atmosphere, and titrating with the alkali to a pH above 9, and preferably above 11 and even as high as 13. It is critical that the pH be high enough to solvate the desired loading of curcumin. Generally, five to ten minutes of agitation is sufficient to dissolve fine powder, at which time the solution is filtered to remove insoluble materials. (If an oleoresin turmeric, rather than crystalline curcumin, is used, the aqueous phase is preferably separated from the insoluble oil phase, and then filtered. The oil phase will contain both flavor and haze-forming lipids, and is generally undesirable in the finished coloring.)

The concentration of curcumin is not crucial, the range of 1 to 15% being practical, and 7 to 10% being most preferable and easy to manipulate, at a pH of between about 11 and 13.

The alkaline curcumin solution degrades at a rate of about 7% per hour at 20° C., and turns brownish. It should be mixed as quickly as possible into the substrate, with the pH remaining above about 9, and preferably above 11, and agitated with the substrate dissolved in water for a few minutes, to allow complexing, before acidification.

The alkaline curcumin solution used in the following examples, unless otherwise specified, was made by pulverizing crystalline curcumin, wetting it with water to make a 7.5% suspension, and degassing under vacuum. It was than titrated to a pH of 12 with 10% KOH, agitated ten minutes, filtered, and immediately mixed with a neutral or alkaline solution of the substrate, maintaining the pH above about 9 and preferably above 11. While this is the preferred procedure, other variations, such as wetting the curcumin with an alcohol, will be apparent to those skilled in the art.

EXAMPLE 2.

Preparation of a Gelatin Complex, a Preferred Form of The Invention

A 2% solution of Knox TM unflavored gelatin was prepared. Its pH was 5.8, and it was raised to pH 10 with a few drops of 10% KOH. (Gelatins of other "bloom" are equally useful).

A 7.5% solution of curcumin was made as in Example 1, added to the gelatin solution and agitated for five minutes, and then neutralized to pH of about 4.5 with 10% phosphoric acid. The solution remained clear.

The amount of curcumin solution added to the gelatin provided either a 3.7% or 15% loading (ratio of weight of curcumin to gelatin) of curcumin on the gelatin. When diluted in water, both loadings gave clear yellow, stable solutions.

The gelatin solution can be used as such or dried to a powder, which redissolves in water to give a clear solution.

The powder is indefinitely stable.

The improved light stability of the gelatin complex was demonstrated by making it into an aqueous solution having a concentration of 7 ppm curcumin, and comparing it with a solution of curcumin in polysorbate 80 at the same 7 ppm concentration. The polysorbate solution faded within 10-20 minutes in diffuse sunlight, and the gelatin solution retained a lemon color after two hours. Spectrophotometric analysis of the two solutions, in aqueous phase, showed a typical curcumin scan for the polysorbate material, with a clear peak at 423 nm and an inflection at about 450 nm. The scan of the gelatin-curcumin complex solution showed a broad peak at about 420 nm, and no inflection in the curve at 450. This indicates that the curcumin is in fact complexed with the gelatin, and not present as a free dissolved pigment, as it is in the emulsified polysorbate 80 solution. (This may be an explanation of its stability in light.)

The 3.7% curcumin-gelatin complex solution was stored in a refrigerator, and then used as follows:

1. Pickles.

A pickle brine consisting of 6 cups (47%) vinegar (5% acid), 6 cups (47%) water, and ¾ cup (6%) salt was brought to a boil, and the colorings listed below were added to give the desired hue to the brine.

The hot brine was poured over sliced cucumbers, and the Mason jars sealed and pasteurized.

The Langenau microcrystalline suspension of curcumin was included in the test, as well as compositions containing non-polysorbate dispersing agents for turmeric and flavorings. The Langenau product did not provide coloring to the pickles, whereas the products containing dispersing agents did not interfere with the gelatin solutions. Indeed, they clarified on standing and appeared similar to the unflavored clear gelating colored jar.

The colors of the pickles and brine were noted after one week. See Table 1.

TABLE 1

| Coloring | Coloration of Pickles | |
|---|---|---|
| | Brine Appearance in Jar | Pickles |
| 1. Langenau microcrystalline | colorless | colorless |
| 2. Gelatin complex | clear yellow | yellow |
| 3. Gelatin complex, citric acid brine | clear yellow | yellow |
| 4. Gelatin complex plus turmeric per Todd U.S. Pat. No. 4,315,947 Example 1 | hazy yellow | yellow |
| 5. Same plus pickle flavoring per | hazy yellow | yellow |

TABLE 1-continued

| Coloring | Coloration of Pickles | |
|---|---|---|
| | Brine Appearance in Jar | Pickles |
| same U.S. Pat. | | |
| 6. Polysorbate 80 solution of oleoresin turmeric | slight haze | yellow |

2. Pudding.

A pudding base was prepared by mixing one tablespoon of cornstarch with 100 ml cold water, adding 4 ml of the gelatin-curcumin complex, bringing to a boil to gelatinize the starch, and cooling. The pudding had a lemon color.

3. Chicken parts.

Chicken wings were dipped into a rinse consisting of water and 25% of the above gelatin-curcumin complex solution, and allowed to soak for one minute. They were withdrawn and cooled, whereupon they had a uniform yellow color.

Chicken wings similarly treated with the product of Langenau, an alkaline solution of curcumin, per his Example 2, were mottled in coloration and unacceptable, both because of the mottling and the residual acid used to neutralize the alkaline curcumin solution.

The colored surface of the chicken was removed and dried at 50° C. Upon extraction with acetone, color remained on the chicken colored with the complex of curcumin and gelatin, whereas it was readily removed from the alkaline-dyed chicken, showing that, in the latter case, the curcumin was not complexed, but rather in its free form, sorbed on the surface of the chicken as described by Langenau.

This demonstrates that the coloration upon dipping chicken in potassium curcumate, and then acidifying, is due to the deposition of microcrystalline curcumin and that the curcumin is sorbed and not complexed.

The gelatin-curcumin complex, on the other hand, uniformly coats the chicken.

EXAMPLE 3.

Preparation of Various Polysaccharide Complexes and Hybrid Curcumin Complexes 40 g of Capsul (a modified water-soluble branched-chain polysaccharide starch made by National Starch) and 60 ml of water were mixed, and the starch was allowed to hydrate for five hours. The pH was then raised to 11 with 10% KOH. Sufficient alkaline curcumin solution from Example 1 (20 ml) was added, and the mixture agitated ten minutes. It was then acidified slowly using citric acid.

The resulting yellow viscous fluid polysaccharide curcumin complex was used to color beverages by adding to a pleasing level. In a beverage containing sugar, such as SEVEN-UP ™, colored polysaccharide will fall to the bottom, just as would uncolored polysaccharide. This fall-out is due to the effect of sugar on the saccharide, and not due to the curcumin-polysaccharide complex. In the case of fruit drinks, or other beverages with a cloud, this is not objectionable.

The polysaccharide-curcumin preparation may be dried and pulverized, admixed with a starch or other flour, and then used in puddings or baked goods.

The preparation is resistant to fading in light and, unlike the product of Leshick, it is unnecessary to encapsulate it.

The dry product is stable indefinitely (over three years in light), and redissolves in water upon hydration of the starch.

Other useful substrates are branched-chain vegetable gums, such as arabic, maltodextrins made from amylopectin starches with a dextrose equivalent of preferably five to fifteen, propylene glycol alginate, and pectin (high methoxy pectin preferred). Less soluble gums such as ghatti and karaya, as well as methyl cellulose, which is branched chain, are acceptable but not preferable. Pectin, being a common constituent of jams and jellies, and providing a crystal clear complex at 5% curcumin content, is a particularly useful embodiment. These complexes all show the improved light stability of the modified starch complex.

Malto-dextrins, preferably made from waxy maize starch, dextrose equivalent from 5 to 15, as well as vegetable gums, such as arabic, are complexed with curcumin in the same manner. Such gums are described in Whistler, "Industrial Gums".

Moreover, mixtures of polysaccharides, of proteins, and of polysaccharides and proteins are contemplated for this process and product. For example, a 50:50 mixture of gum arabic and gelatin give a curcumin complex which remains sparkling clear at higher concentrations than does a complex of curcumin with either substrate alone.

As with the gelatin complex, the absorbance scan of the foregoing aqueous solutions is altered from that of a solution of curcumin itself.

EXAMPLE 4.

Preparation of a Gum Arabic-Curcumin Complex and its use in Encapsulation by Spray Drying.

A 10% solution of gum arabic (substrate) was made and filtered to remove extraneous materials. The pH was raised to 10 and, to 200 ml of this solution, 20 ml of the 7.5% curcumin solution of Example 1 was added. It was agitated ten minutes and acidified. To this is added 4 ml of peppermint oil, the mixture emulsified, and then spray dried. The bright yellow powder, in which the curcumin is complexed with the polysaccharide arabic coating, eliminates the need for polysorbate 80 to effect coloration of the essential oil (with resulting instability of the product), as well as reduces the curcumin dosage because color is on the surface of the capsule.

The gum arabic complex may be used directly in beverages.

When other complexing and encapsulating agents, such as malto-dextrins and modified food starches, are used in place of the gum arabic, essentially the same advantageous result is obtained. Additional and equally-satisfactory substrates include other vegetable gums (see Whistler, L.L. ed., Industrial Gums, 2nd ed. (1973)), milk protein, whey, sodium caseinate, gelatin, modified food starch, cyclodextrins, pectin, propylene glycol alginate, water-soluble maltodextrins derived from amylopectin, and carboxymethylcellulose.

EXAMPLE 5.

Comparative Strength and Light Stability of Preparation of The Invention

To make preparations with exactly the same content of curcumin, ground curcumin was agitated in boiling water, in which it is slightly soluble, and filtered. Upon cooling, microcrystalline curcumin was present as a haze. Assay showed it to be at a concentration of 27 p.p.m. This solution was treated as follows:

a. To 200 ml, 0.26 g of gelatin was added and the mixture agitated and warmed to 70° C. It became clear as the curcumin dissolved. It was cooled, and became hazy. 100 ml of this solution was raised to a pH of 11.45, agitated ten minutes, and acidified. It was clear, showing that the elevation of pH is required to form a gelatin complex. The uncomplexed solution threw a precipitate of curcumin overnight, whereas the complexed solution remained clear, without throwing a precipitate.

This shows that the method of Walter will not work, for the hot water, in which the curcumin was dissolved, did not enable a complex to be formed. (Walter does not form a complex, but rather microcrystals.)

b. To 100 ml, 0.26 g of microcrystalline cellulose was added, and the mixture warmed to 70° C. It remained hazy, since cellulose is insoluble in water. It was cooled and, to 50 ml, KOH was added to pH 11.45, the mixture agitated for ten minutes, and then acidified to about 6.5. The other 50 ml of curcumin-cellulose solution was not pH adjusted, it remaining below 7. Both solutions were similar in appearance, showing that complexing of curcumin on this straight-chain polysaccharide did not occur. Carboxymethylcellulose, a branched-chain derivative of cellulose, behaves like gum arabic under the same conditions, the uncomplexed solution remaining hazy, while the solution of the complex, produced by forming the complex under alkaline conditions and then acidifying, is clear, and no precipitation occurs.

Gum karaya, a branched-chain polysaccharide, behaves similarly, whereas gum guar, a linear polysaccharide, behaves like cellulose.

c. To 100 ml, 0.14 g of polysorbate 80 was added, and warmed with agitation, upon which it became clear. It remained clear on cooling, the curcumin being dissolved into and emulsified by the polysorbate 80.

d. The same procedure was used, substituting 1.5 g of beta cyclodextrin (cyclic, conical carbohydrate). Again, only the alkaline complexed solutions were clear, and did not fade. The uncomplexed solution threw a yellow precipitate, which was curcumin.

Since the polysorbate 80-curcumin solution and the complexed curcumin-gelatin solutions were both clear to the eye, they could be compared for visual intensity. This was done utilizing the Nessler tube technique, in which solutions of known dye concentration (in this case, equal) are placed in flat-bottomed tubes, in a dark box, exposing only the bottoms of the tubes to light. The tinctorial power is measured by comparing the heights of the liquids, of equal visual intensity. In this case, the ratio of gelatin complex to polysorbate emulsion, both diluted in water 1:10, was 13.6 mm to 20.7 mm light path. This means that the tinctorial power of curcumin complex on gelatin is 1.5 times that of an equal amount of curcumin dissolved and emulsified in the conventional manner with polysorbate 80! This is clearly an unexpected result of the complexing phenomenon.

Since, in most applications using polysorbate 80, the level of curcumin is about 90 ppm in the aqueous phase of the food, stability in light is compared by placing solutions of the following in 10 ml test tubes and exposing them to north daylight. Results are noted:

| Composition | Clarity | Color Intensity |
|---|---|---|
| polysorbate 80 | clear | fades in 3½ hours |
| Gelatin, not complexed | hazy | fades in 8 hours |
| Gelatin, complexed | clear | yellow after two days |
| Capsul, not complexed | hazy | fades in 8 hours |
| Capsul, complexed | clear | yellow after two days |

The great improvement in light stability over polysorbate 80 preparations demonstrates the practical advantage of the complexed curcumin. What is most surprising, however, is that it is even more stable than the initial microcrystalline curcumin suspensions.

The complexes had loadings of 10% curcumin to weight of substrate. Complexes made by the same procedure using pectin, arabic, waxy maize maltodextrins, and propylene glycol alginate showed similar superiority in light stability, as well as tinctorial power.

This Example clearly differentiates the product of this invention from that of Langenau, his Example 1, wherein he forms the microcrystalline precipitate of curcumin, but does not complex it.

Likewise, the cyclodextrin products were dried and immersed as a powder in acetone. The alkaline-complexed powder remained colored, whereas the uncomplexed powder lost all its curcumin to the acetone.

This Example clearly demonstrates the difference in kind between the alkaline-complexed curcumin and the uncomplexed products of the prior art.

The presence of a water-miscible, non-acidic solvent, such as alcohol or polyol, e.g., ethyl alcohol, glycerine, propylene glycol, etc., will not interfere with the complexing of the alkaline curcumin with the substrate, e.g., provided it does not prevent the gelatin or other substrate from dissolving. Although the presence of such solvents increases the solubility of the alkaline curcumin, they are not preferred because of the added cost involved.

EXAMPLE 6.

Resistance to Discoloration of Margarine Wrapping Paper using Complexes of The Invention Curcumin was complexed with non-fat dry milk solids (40% protein) in accordance with Example 1, to give 1.1% curcumin on the solids. Curcumin, in microcrystalline form prepared by precipitation from alkaline solution when added to an acidic solution by the method of Langenau, Example 1, was admixed with the same milk solids to give the same concentration, as was the product of Woznicki and Shinagawa, and also of Schranz.

To test whether or not the curcumin is in a non-complexed state which will wick, or in a bound, complexed state in which it will not wick, a simple test may be used. This involves placing a ¼" by 6" blotting strip, used by perfumers for aroma evaluation, in 20 ml of the curcumin substrate mixture suspended or dissolved in water, placed in a 100 ml beaker. The concentration of curcumin in the water should be about 0.02%, although this is not critical. The water is allowed to wick up the blotting strip and evaporate, transporting curcumin dissolved in it along the strip. Preferably, the water is held at about 50° C. to increase the curcumin solubility. In the case of gelatin and whey or milk solids, some substrate will diffuse up the strip, but not reach the top. In the case of free curcumin, on the other hand, a light coloring will be present along the entire extent of the strip.

Whether the curcumin on the strip is bound to the substrate, which has diffused up the strip, or free, can be determined by drying the strip and eluting with acetone. The acetone will wick any free curcumin, which moves to the top of the strip as the acetone evaporates. This occurs with the preparation of Schranz, made with gelatin and acetic acid, as well as with the microcrystalline curcumin of Langenau and the microcrystalline cellulose colored according to Woznicki and Shinagawa. Curcumin is not eluted from the paper containing dried complexed curcumin-substrate, showing that these preparations are resistant to discoloration of margarine wrapper.

This again demonstrates the difference in kind of this invention over the prior art.

A repeat of the foregoing procedure employing other substrates as set forth in the preceding Examples is productive of essentially the same desirable result.

EXAMPLE 7.

Coloring of Dairy Products with Complexes of The Invention

Since sodium caseinate, whey, and non-fat milk solids are derived from milk, they are particularly useful substrates for complexing curcumin for coloring dairy products.

For example, powdered curcumin complexed on these substrates, as well as curcumin-gelatin complex (prehydrated), was stirred into cream containing 10% sugar. The color, a lemon yellow, developed promptly as the powder dissolved and remained uniform throughout the beverage.

Obviously, the dairy products can be colored as lightly or deeply as desired.

Since whey and non-fat dry milk solids are by-products of the dairy industry, and are spray dried, one embodiment of this invention is to complex the curcumin with the dairy product by mixing therewith at a pH above about 9 and dropping the pH to below about 8 prior to drying of the aqueous mixture, to obviate the need for redissolution and drying, and obtaining the colored curcumin-substrate complex in a single drying operation. These dry powders are useful for coloring aqueous systems and for dusting upon other foods, as well as for addition to a food as a component of a dry seasoning.

For example, a combination of 91 ml of alkalinized skim milk or whey and 3.0 ml of a 6.6% alkaline curcumin solution were agitated for ten minutes at pH 10.2, and acidified to pH 6.8. The solution was evaporated to dryness and the dry powder readily redispersed in water to give a yellow solution in each case.

A water-soluble hydrolyzed soy bean protein may also be used as a substrate provided clarity is acceptable.

EXAMPLE 8.

Further Comparisons of Complexes of The Invention with Prior Art

A. The gelatin product of Schranz, Example 4, was prepared in aqueous acetic acid solution and dispersed in water. It gave a hazy solution which, upon centrifuging, separated into a lightly-colored aqueous layer and a precipitate. By comparison, the gelatin complex of Example 2, with 3.7% and 15% loading, was diluted to the same visual intensity as the product of Schranz, and centrifuged. No separation of the clear solution occurred, it retaining its clear lemon-yellow color. The precipitate from the Schranz product was separated and dried, and was immediately totally soluble in acetone, showing that it was free microcrystalline curcumin. It was further substantiated that it was uncomplexed curcumin by exposing equal-appearing aqueous solutions of the present gelatin-curcumin complex and the product of Schranz to daylight. The latter product faded to a brownish-orange in three hours, whereas the complexed product retained its lemon-yellow coloration. Since the gelatin substrate was the same, this is an excellent illustration of the criticality of forming a complex under alkaline conditions, for it will not form under acidic conditions. The latter product did not color skim milk, as did the curcumin complexed on gelatin.

B. The microcrystalline product of Langenau, Example 2, precipitated and sorbed on the surface of chicken by acid, was shown to be uncomplexed with the chicken skin, which accounts for its mottling and also for its lack of persistence upon sauteing. The microcrystalline suspension of his Example 1 fails to color the brine solution, whereas the complexed curcumin of this invention does color the brine, which remains clear. Nor does the Langenau product color skim milk.

C. The procedure of Woznicki's Example 1 was followed, at one-tenth the scale. The slurry of cellulose and aluminum chloride, which had a pH of 3.5, was warmed to 50° C. and the alkaline curcumin solution added slowly with agitation. The red solution turned yellow immediately, and remained so, as the pH increased only to 4 at the end of the addition. Upon stirring for an hour, and washing the cake, the resulting cellulose-curcumin microcrystalline cake redispersed in water with agitation, but of course settled out. On dilution and heating in water, the curcumin dissolved off the cellulose, leaving colorless cellulose below the hot, colored water, from which curcumin precipitated on cooling. Two critical aspects of the present invention are missing in this instance: cellulose is not a branched-chain polysaccharide, and the curcumin was not admixed with the substrate under alkaline conditions. This experiment shows that a prior art fixing agent (as per Woznicki) is not necessary and, more importantly, the process of the present invention works to produce the desired stable complex of curcumin, whereas Woznicki's process does not.

D. Similarly, the product made using cellulose according to Shinagawa disperses in water, but does not give a stable solution. The curcumin is shown to be uncomplexed, since it can be made to dissolve in hot water and separated from the insoluble cellulose particles. This demonstrates that the presence of branched chains is critical to this invention.

It is thus seen that the present invention provides a novel, light stable, water-soluble, clear, and adaptable turmeric color which differs in kind from the prior art, being a complex of curcumin formed on a substrate in alkaline solution, and then neutralized to its acidic form as a complex on the substrate. This novel complex is shown to have unique properties not available to the prior art.

Critical to the present invention is the dissolution of curcumin in alkaline solution, admixing with a substrate which may be a branched-chain or cyclic polysaccharide or a water-soluble or water-dispersible protein, and acidification. As has been shown, the substrate may be a common component of food, which has value in itself, and which is compatible with food in which the color is used. Coloring to taste is readily achieved.

A remarkable, valuable, and surprising discovery is the improved tinctorial power and light stability of the complex of the present invention when compared with similar prior art products, as well as the improved clarity of brine solutions produced therewith.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

REFERENCES

Borenstein, U.S. Pat. No. 3,316,101—Apr. 25, 1967
Gidlow, U.S. Pat. No. 4,187,323—Feb. 5, 1980
Langenau, U.S. Pat. No. 2,982,656—May 2, 1961
Leshik, U.S. Pat. No. 4,307,117—Dec. 22, 1981
Maing, U.S. Pat. No. 4,263,333—Apr. 21, 1981
Marotta, U.S. Pat. No. 3,455,838—July 15, 1969
Schranz, U.S. Pat. No. 4,368,208—Jan. 11, 1983
Shinagawa, Japan, 79,163,866—July 24, 1979
Stransky, U.S. Pat. No. 4,138,212—Feb. 6, 1979
Sreenivasan, U.S. Pat. No. 4,304,792—Dec. 8, 1981
Sreenivasan, U.S. Pat. No. 4,414,234—Nov. 8, 1983
Todd, U.S. Pat. No. 3,162,538—Dec. 22, 1964
Todd, U.S. Pat. No. 4,315,947—Feb. 16, 1982
Walter, U.S. Pat. No. 3,790,688—Feb. 5, 1974
Woznicki, U.S. Pat. No. 4,475,919—Oct. 9, 1984
Whistler, R. L., Editor, *Industrial Gums*, Second Edition—1973

I claim:

1. A process for preparing a complex of curcumin and a substrate selected from the group consisting of a water-soluble branched chain or cyclic polysaccharide and a water-soluble or water-dispersible protein and combinations thereof which comprises contacting the substrate and curcumin in an aqueous solution at a pH above about 9, at which pH the curcumin is present in its water-soluble red alkaline form, and then acidifying to drop the pH to below about 8, thereby complexing the curcumin in its neutral yellow form with the substrate.

2. A process of claim 1, wherein the substrate is selected from the group consisting of milk protein, sodium caseinate, whey, gelatin, modified food starch, pectin, a vegetable gum, propylene glycol alginate, cyclodextrin, maltodextrin derived from amylopectin, and carboxymethylcellulose.

3. A process of claim 1, wherein the pH of the aqueous solution prior to acidification is above about 11.

4. A process of claim 2, wherein the curcumin is complexed with a combination of substrates.

5. A process of claim 2, wherein the substrate is a combination of gelatin and a vegetable gum.

6. A process of claim 2, wherein the substrate is gelatin, gum arabic, gum karaya, gum ghatti, modified food starch, cyclodextrin, or carboxymethylcellulose.

7. A process of claim 1, wherein the process is carried out in the presence of a water-miscible, non-acidic solvent which does not interfere with the complexing of the alkaline curcumin with the substrate.

8. A process of claim 7, wherein the solvent is selected from the group consisting of alcohols, glycerine, and propylene glycol.

9. A process of claim 7, wherein the solvent is ethyl alcohol, glycerine, or propylene glycol.

10. A curcumin complex comprising curcumin and a substrate selected from the group consisting of a water-soluble branched chain or cyclic polysaccharide and a water-soluble or water-dispersible protein and combinations thereof, which will not precipitate upon standing in water, which gives an essentially stable yellow solution in water, and from which complex curcumin cannot be removed by centrifugation, said complex being prepared by precipitation by acid from an alkaline curcumin- and polysaccharide- and/or protein-containing solution.

11. A complex of claim 10, wherein the substrate is selected from milk protein, sodium caseinate, whey, gelatin, modified food starch, pectin, a vegetable gum, propylene glycol alginate, cyclodextrin, maltodextrin derived from amylopectin, and carboxymethylcellulose.

12. A complex of curcumin with a substrate selected from the group consisting of a water-soluble branched chain or cyclic polysaccharide and a water-soluble or water-dispersible protein, the curcumin being complexed to the substrate by acidification from an alkaline solution of curcumin and substrate.

13. A curcumin complexed with a substrate selected from the group consisting of a water-soluble branched chain or cyclic polysaccharide or a water-soluble or water-dispersible protein by a process which comprises contacting the substrate and curcumin in an aqueous solution at a pH above about 9, at which pH the curcumin is present in its water-soluble red alkaline form, and then acidifying to drop the pH to below about 8, thereby complexing the curcumin in its neutral yellow form with the substrate.

14. A curcumin complexed with a water-soluble branched-chain or cyclic polysaccharide or a water-soluble or water-dispersible protein according to the procedure of claim 2.

15. A curcumin complexed with a water-soluble branched-chain or cyclic polysaccharide or a water-soluble or water-dispersible protein according to the procedure of claim 3.

16. A curcumin complex produced according to the procedure of claim 4.

17. A curcumin complex produced according to the procedure of claim 5.

18. A curcumin complex produced according to the procedure of claim 6.

19. A curcumin complex produced according to the procedure of claim 7.

20. A curcumin complex produced according to the procedure of claim 8.

21. A curcumin complex produced according to the procedure of claim 9.

22. A process of preparing a dry milk solid-curcumin complex comprising mixing curcumin and liquid whey or skim milk, providing an alkaline pH above about 9 in the mixture, agitating the mixture at an alkaline pH above about 9, dropping the pH to below about 8, and then drying.

23. A dry milk solid product produced by the method of claim 22.

24. A food or beverage colored with a complex of curcumin with a water-soluble or water-dispersible protein or branched-chain or cyclic polysaccharide produced by acid precipitation from an alkaline curcumin and protein- and/or polysaccharide-containing admixture thereof.

25. A food product of claim 24, wherein the complex is in dried and powdered form.

26. A food product of claim 24, wherein the complex is in liquid form.

27. A curcumin complex comprising curcumin, in its neutral yellow form, and a substrate selected from the group consisting of a water-soluble branched-chain or cyclic polysaccharide and a water-soluble or water-dispersible protein and combinations thereof, which will not precipitate upon standing in water, which gives an essentially stable yellow solution in water, and from which complex curcumin cannot be removed by centrifugation.

28. A curcumin complex of claim 27, wherein the substrate is selected from the group consisting of milk protein, sodium caseinate, whey, gelatin, modified food starch, pectin, a vegetable gum, propylene glycol alginate, cyclodextrin, maltodextrin derived from amylopectin, carboxymethycellulose, and combinations thereof.

29. A food or beverage colored with a complex of curcumin comprising curcumin and a water-soluble or water-dispersible protein or branched-chain or cyclic polysaccharide or a combination thereof, said complex being according to claim 27.

30. A food or beverage colored with a complex of curcumin comprising curcumin and a water-soluble or water-dispersible protein or branched-chain or cyclic polysaccharide or a combination thereof, said complex being according to claim 28.

* * * * *

UNITED STATES PATENT AND TRADEMARK OFFICE
CERTIFICATE OF CORRECTION

PATENT NO. : 4,999,205

DATED : March 12, 1991

INVENTOR(S) : Paul H. Todd, Jr.

It is certified that error appears in the above-identified patent and that said Letters Patent is hereby corrected as shown below:

Title Page, [56] References Cited, U.S. PATENT DOCUMENTS, line 13, "Gavin" should read -- Garin et al. --

Col. 1, line 67; "use" should read -- used --

Col. 3, line 29; "efect" should read -- effect --

Col. 3, line 39; "sytems," should read -- systems, --

Col. 7, line 51; "gelating" should read -- gelatin --

Col. 7, TABLE 1, first column, item 3., second line; after "acid" insert -- in --

Col. 9, line 2; "Leshick," should read -- Leshik, --

Col. 16, line 41; "carboxymethycellulose," should read -- carboxymethylcellulose, --

Signed and Sealed this

Fifteenth Day of September, 1992

Attest:

DOUGLAS B. COMER

*Attesting Officer*    *Acting Commissioner of Patents and Trademarks*